Feb. 2, 1971  C. F. W. THORLIN  3,560,095
THEODOLITE
Filed May 26, 1969
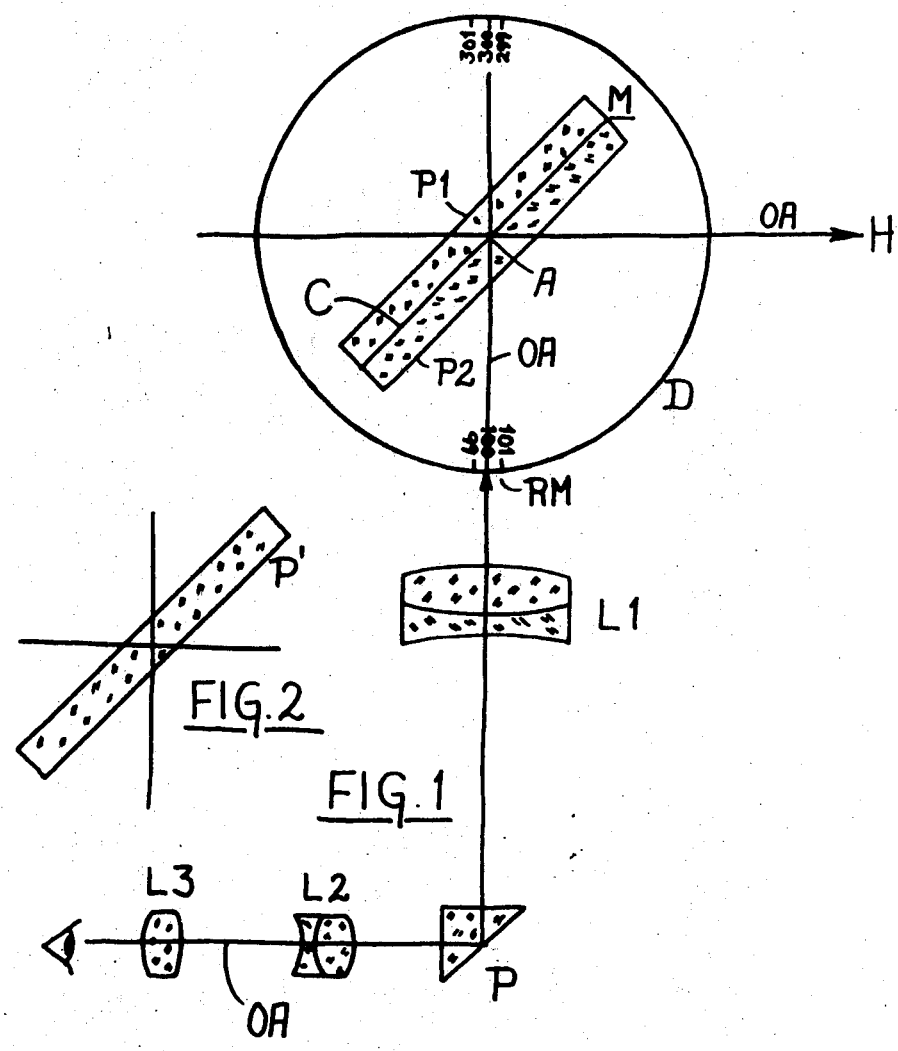
INVENTOR
CHARLES F. W. THORLIN
BY *Larson and Taylor*
ATTORNEYS United States Patent Office 3,560,095
Patented Feb. 2, 1971

3,560,095
THEODOLITE
Charles Fredrik Wilhelm Thorlin, Stockholm, Sweden, assignor to AGA Aktiebolag, Lidingo, Sweden, a corporation of Sweden
Filed May 26, 1969, Ser. No. 827,500
Claims priority, application Sweden, June 7, 1968, 7,649/68
Int. Cl. G01b *11/26*
U.S. Cl. 356—140                4 Claims

ABSTRACT OF THE DISCLOSURE

In a theodolite, the optical axis is deflected by a mirror attached to a rotatable disk having a circumferential scale graduated in angles. To eliminate errors of centricity of the disk axis relative to the scale, the disk is reversible about the axis of rotation and the mirror is provided with a reflective surface on the rear side, scale markings being provided for reading off a value 180° different from that corresponding to the original position.

BACKGROUND OF THE INVENTION

The invention relates to a theodolite of the type having a mirror which is tiltable about an horizontal axis and attached to a disk having its circumference graduated in angles, and where the optical axis or sighting line of the instrument is reflected by the tiltable mirror from a direction, whose deviation from a predetermined direction is to be measured.

An instrument for measuring angles is known from French patent specification 1,039,285 to comprise a mirror which is attached to a rotatable disk provided with angular graduation at its circumference. The mirror has a pair of opposite reflective surfaces which serve to extend the range of measurements, one side being used for one range and the other side for a different range.

Summary

The essential feature of the invention is that the mirror has opposite reflective surfaces and is reversible by 180°. The angular graduation is adapted to provide readings in both positions of the mirror, thereby making possible elimination of the error resulting from a lack of centricity of the axis of rotation relative to the scale.

The drawing

FIG. 1 is a schematic side view of the essential optical component of an embodiment of the invention.
FIG. 2 is a modified form of the mirror.

DESCRIPTION OF PREFERRED EMBODIMENTS

In FIG. 1, H is the horizontal direction, the deviation or angular distance from which is to be measured with the aid of a reflector or mirror M which is rotatable on an axis A which is perpendicular to the plane of the drawing. The optical axis OA is deflected by the mirror from the horizontal direction H, as shown in the drawing, to the perpendicular and is then deflected back to the horizontal by a deflecting means in the form of a prism P. Lenses L1, L2 and L3 make up an optical system for forming the image to be viewed by the observer.

The mirror M, as shown, comprises a pair of planeparallel glass plates P1, P2 cemented together to form reflective surfaces on both sides of the contact surface C therebetween.

The mirror M is integrally mounted on a rotatable disk D provided with a peripheral graduation in angle units which can be read off against a reference mark RM.

In operation, when a reading has been taken with the disk D in the position shown, the disk is rotated through one-half turn to make use of the opposite side of the surface C. The mean value between the two readings obtained is the corrected value compensated for the uncentricity of the axis of rotation A relative to the center of the angular graduation scale.

FIG. 2 shows a modified embodiment of the mirror in the form of a single planoparallel glass plate P, both sides of which can serve as reflectors.

I claim:
1. A theodolite comprising:
   a lens system having an optical axis and capable of forming an image to be viewed by an observer,
   reflecting means for deflecting said optical axis and having an axis of rotation perpendicular to said optical axis,
   a rotatable angularly graduated scale member integral and coaxial with said reflecting means,
   characterized in that said reflecting means is reversible about said axis of rotation and comprises a pair of parallel opposite reflecting surfaces, said scale member being provided with graduation for reading off the angle value of the reversed position.
2. A theodolite as claimed in claim 1, in which said reflector member comprises a pair of planoparallel glass members cemented together and forming a doubly reflective contact surface therebetween.
3. A theodolite as claimed in claim 1, in which said reflector member is a single planoparallel glass plate.
4. A theodolite as claimed in claim 1, in which a deflecting means is provided in said deflected optical axis for rectangular deflection thereof.

References Cited

FOREIGN PATENTS
1,039,285    10/1953    France _____ 12—3

RONALD L. WIBERT, Primary Examiner
P. K. GODWIN, Assistant Examiner

U.S. Cl. X.R.
33—69; 356—142